(12) United States Patent
Misawa (10) Patent No.: US 6,351,612 B1
(45) Date of Patent: Feb. 26, 2002

(54) CAMERA BODY USING INTERCHANGEABLE LENS

(75) Inventor: Masayuki Misawa, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/544,340

(22) Filed: Apr. 6, 2000

(30) Foreign Application Priority Data

Apr. 12, 1999 (JP) .............................. 11-103843

(51) Int. Cl.[7] .......................... G03B 17/18; G03B 17/00
(52) U.S. Cl. ........................................ 396/287; 396/531
(58) Field of Search ................................ 396/267, 281, 396/287, 354, 529, 531, 535, 544, 532

(56) References Cited

U.S. PATENT DOCUMENTS 4,417,814 A * 11/1983 Doliber ...................... 356/252
5,570,153 A    10/1996 Shono ......................... 396/531

* cited by examiner

*Primary Examiner*—David M. Gray
*Assistant Examiner*—Rochelle Blackman
(74) *Attorney, Agent, or Firm*—Greenblum & Bernstein, P.L.C.

(57) ABSTRACT

A camera body includes a body mount adopted to detachably attach an interchangeable lens thereto, a body index mark which indicates a position of proper alignment of the interchangeable lens with respect to the body mount in order to attach the interchangeable lens to the camera body, and an illuminating device which illuminates the body index mark.

15 Claims, 6 Drawing Sheets

CAMERA BODY USING INTERCHANGEABLE LENS

BACKGROUND OF THE INVENTION

1. Field of the Invention

The present invention relates to a camera body having a body mount to which an interchangeable lens is detachably attached.

2. Description of the Related Art

A conventional camera body (e.g., an SLR camera body) utilizing an interchangeable lens is generally provided on the front face with a body mount (body mount ring) to which a lens mount (lens mount ring) fixed at the rear end of an interchangeable lens is detachably attached. The body mount and the lens mount together constitute a lens mount device (or simply called "lens mount") for coupling the lens to the camera body. Different types of lens mount devices are known. The most popular ones are the bayonet mount and the screw-type mount.

In a bayonet mount, when the lens is coupled to the camera body, firstly a body index mark on, or in the vicinity of, the body mount of the camera body and the corresponding index mark (lens index mark) on, or in the vicinity of, the lens mount of the lens are aligned, and then the lens mount is mounted onto the body mount. Subsequently, the lens is fully turned relative to the camera body in a predetermined rotational direction.

It is easy to attach the lens to the camera body while seeing the positions of the index marks under good light. However, in dim light or in the dark it is difficult to attach the lens to the camera body because the index marks cannot be clearly seen. Accordingly, formerly it is often necessary to carry a flashlight or an external light (which can be connected to a hot shoe on the camera body) together with the camera in case that the lens needs to be attached to the camera body in dim light or in the dark.

SUMMARY OF THE INVENTION

The primary object of the present invention is to provide a camera body having a device which makes it easy to attach the lens to the camera body even in dim light or in the dark.

To achieve the object mentioned above, according to an aspect of the present invention, a camera body is provided which includes a body mount adapted to detachably attach an interchangeable lens thereto, a body index mark which indicates a position of proper alignment of the interchangeable lens with respect to the body mount in order to attach the interchangeable lens to the camera body, and an illuminating device which illuminates the body index mark.

The body index mark is brought into alignment with a lens index mark of the interchangeable lens when the interchangeable lens is attached to the camera body.

Preferably, the body index mark includes a transparent member having a transparent projection fitted into a through hole formed on the body mount. The illuminating device includes a light source for lighting the transparent member from the inside of the camera body. Preferably, the transparent member is colored.

Preferably, the camera body further includes a lock mechanism for locking the interchangeable lens on the body mount after the interchangeable lens is properly coupled to the camera body, a lens-lock-release button which unlocks the lock mechanism when depressed, a switch which is open or closed in accordance with the operation of the lens-lock-release button, and a controller which turns the illuminating device ON or OFF in accordance with a change in an open/closed state of the switch.

Preferably, the controller turns the illuminating device ON at the time the open/closed state of the switch changes in accordance with a depression of the lens-lock-release button.

Preferably, the controller subsequently turns the illuminating device OFF after a predetermined period of time elapses.

Preferably, the camera body further includes a detector for detecting whether or not the interchangeable lens is attached to the body mount, wherein the controller controls the illuminating device such that the illuminating device remains OFF in the case where the detector detects that the lens mount is attached to the body mount even if the lens-lock-release button is depressed.

In an embodiment, the light source includes an LED positioned immediately behind the transparent member.

In an embodiment the camera body further includes a switch which can be manually turned ON and OFF, wherein the illuminating device includes a light source which is turned ON and OFF when the switch is turned ON and OFF, respectively.

In an embodiment, the body mount includes a bayonet type mount.

According to another aspect of the present invention, a camera body includes a body mount adopted to detachably attach an interchangeable lens thereto, a body index mark which indicates a position of proper alignment of the body mount with respect to the lens mount of the interchangeable lens when the interchangeable lens is attached to the camera body; an illuminating device which illuminates the body index mark, a detector adopted to detect whether or not the interchangeable lens is attached to the body mount, and a controller which prevents the illuminating device from turning ON when the detector detects that the lens mount is attached to the body mount.

According to another aspect of the present invention, a camera body includes a body mount adapted to detachably attach an interchangeable lens thereto, a lens-lock-release button which is manually depressed when the interchangeable lens is attached to the body mount, and a light source which is turned ON when the lens-lock-release button is depressed to attach the interchangeable lens to the body mount; the light source illuminating the body mount.

Preferably, a body index mark is further provided which is brought into alignment with a lens index mark of the interchangeable lens when the interchangeable lens is attached to the camera body; wherein the light source is turned ON to emit light towards the body index mark when the lens-lock-release button is depressed.

Preferably, the body index mark is made of a material which allows light to pass therethrough, the light source emitting light outwardly from inside the camera body via the body index mark.

The present disclosure relates to subject matter contained in Japanese Patent Application No.11-103843 (filed on Apr. 12, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
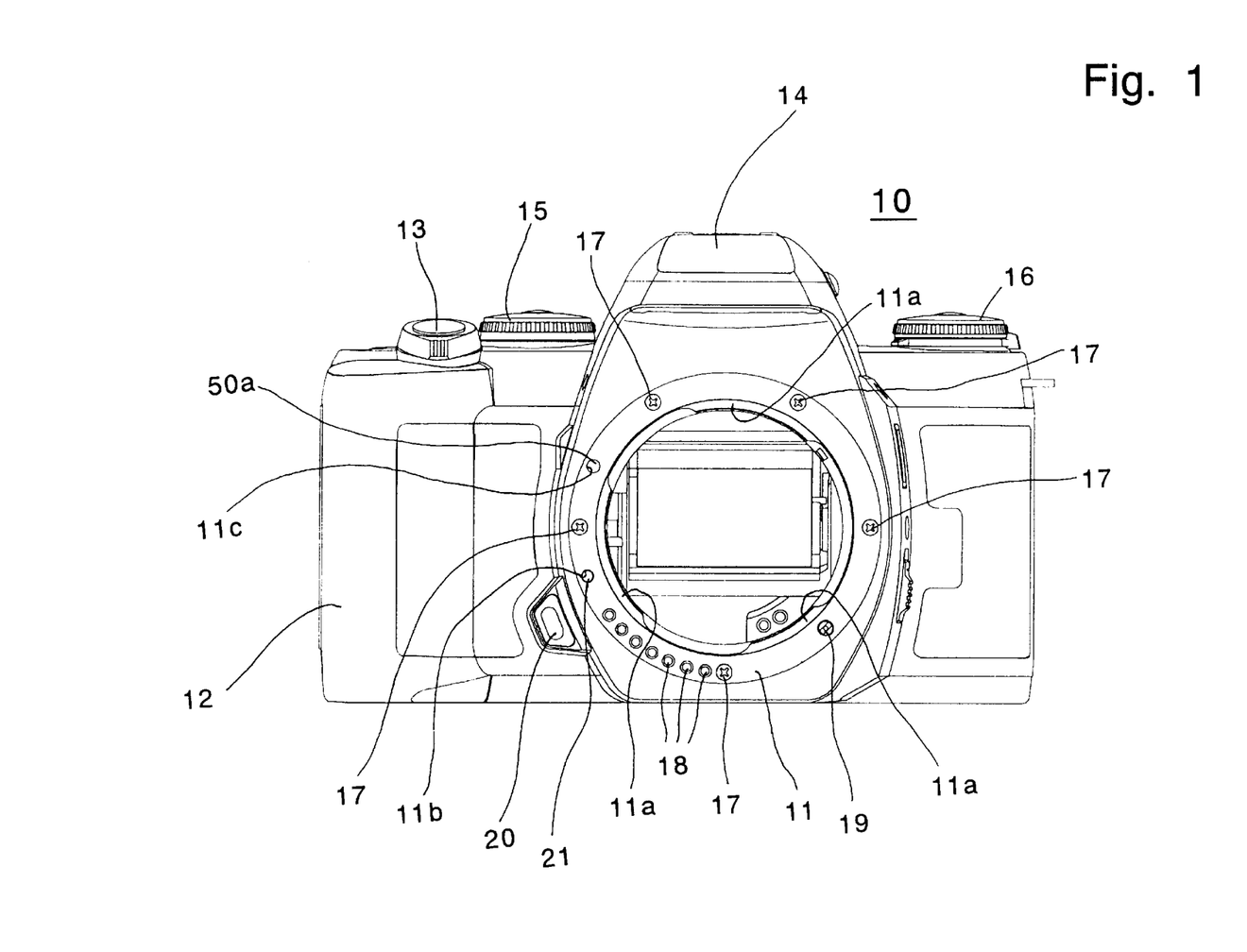
FIG. 1 is a front elevational view of a camera body to which the present invention is applied.
Figure 2:
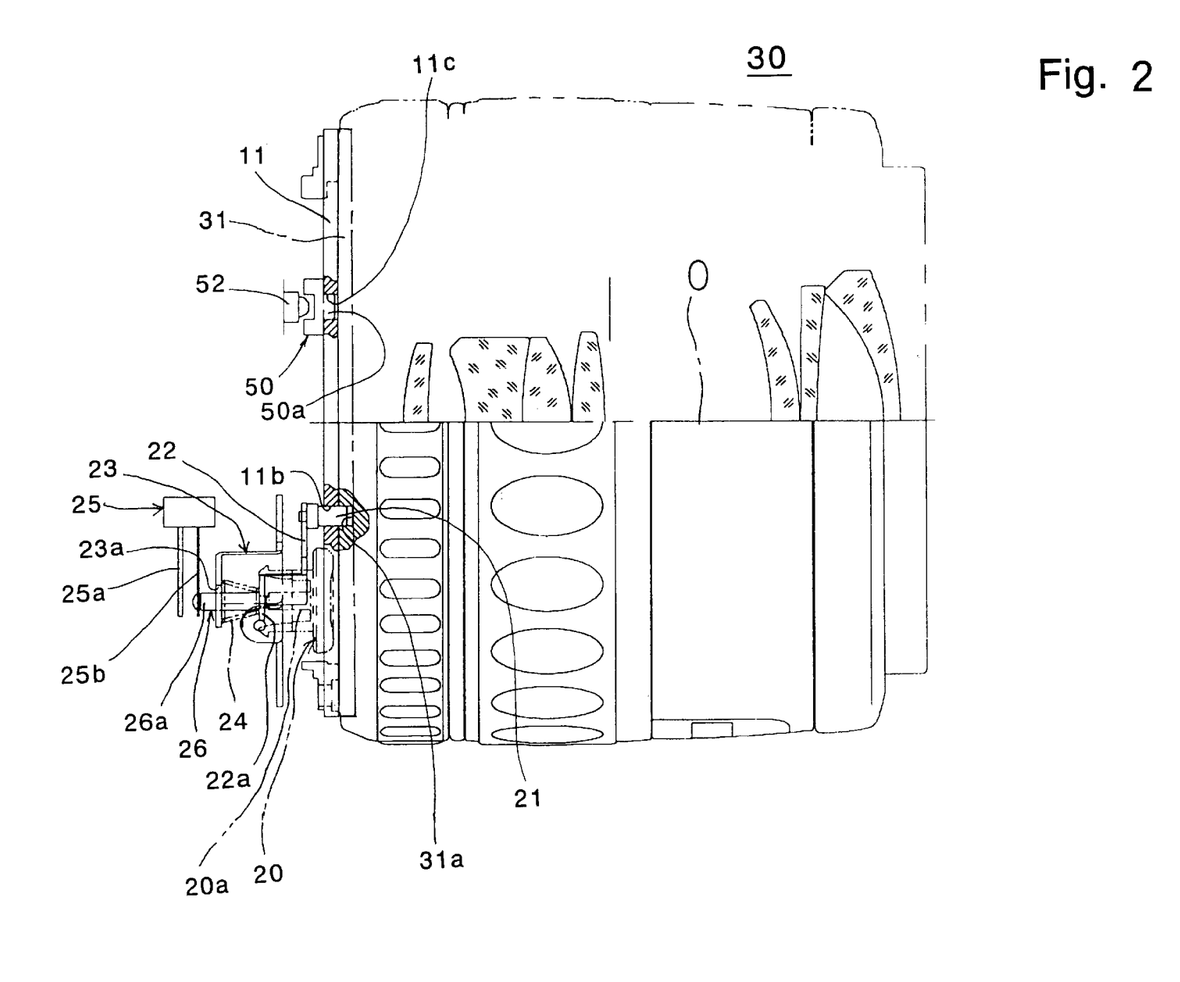
FIG. 2 is a side elevational view, partly in cross section, of an interchangeable lens which is detachably attached to the camera body shown in FIG. 1, a body mount of the camera body shown in FIG. 1, and fundamental elements of the camera body in the vicinity of the body mount.

FIG. 1 shows an embodiment of a camera body 10 to which the present invention is applied, while FIG. 2 shows a lens (interchangeable lens) 30 which is detachably attached to the camera body 10.

The camera body 10 utilizes an SLR camera system and is provided on the front face thereof with a ring-shaped body mount 11. This body mount 11 is a bayonet mount type. The body mount 11 is provided along an inner periphery thereof with three engaging blades 11a. When the lens 30 is coupled to the camera body 10, the three blades 11a are respectively engaged with corresponding three engaging blades (not shown) formed on a lens mount 31 fixed to the rear end of the lens 30.

The camera body 10 is provided on the front left side thereof (as viewed in FIG. 1) with a grip portion 12 having a release button 13 at the top thereof. The camera body 10 is provided at the top center thereof with a retractable built-in flash 14. The camera body 10 is provided, on an upper face thereof on right and left sides (as viewed in FIG. 1) of the built-in flash 14, with an exposure-compensation-value select dial 16 and a shutter-speed select dial 15, respectively. In FIG. 1 the built-in flash 14 is fully retracted into the camera body 10.

Figure 5:
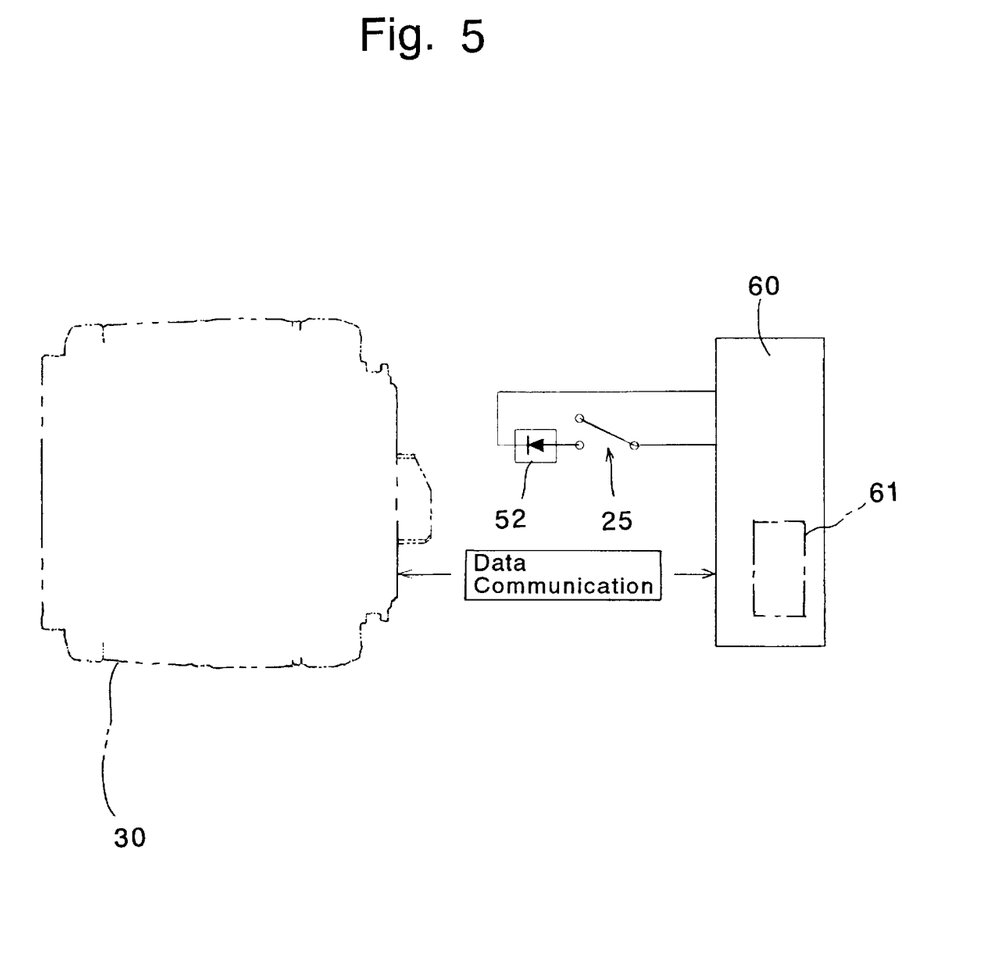
FIG. 5 is a schematic circuit diagram of a control circuit provided in the camera body shown in FIG. 1.
Figure 6:
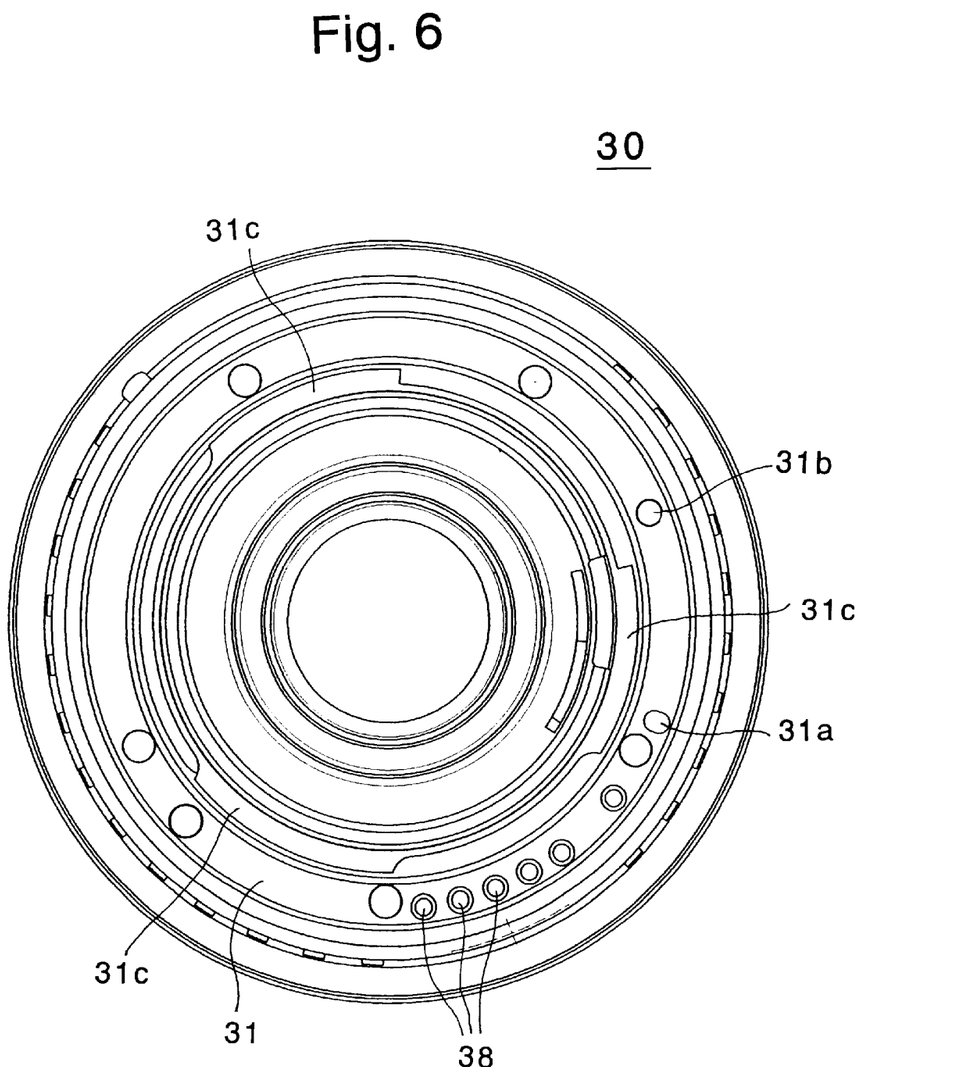
FIG. 6 is a rear elevational view of an interchangeable lens barrel.

The body mount 11 is fixed to the camera body 10 by a plurality of set screws 17. The camera body 10 is provided on the body mount 11 with a set of body contact pins (lens information contacts) 18 which are arranged along a circle about the axis of the body mount 11 at substantially regular intervals. Each body contact pin 18 slightly projects from the front face of the body mount 11 which comes into closely contact with the rear face of the lens mount 31 when the lens 30 is coupled to the camera body 10. Each body contact pin 18 is connected to a microcomputer 60 provided in the camera body 10. As shown in FIG. 5, the microcomputer 60 of the camera body 10 data-communicates with the lens 30 via the set of body contact pins 18 and respective lens contact pins 38 (the camera body 10, body and lens contact pins 18 and 38 are omitted from FIG. 5). As shown in FIG. 6, the lens contact pins 38 are provided on the lens mount 31 of the lens 30. Each body contact pin 18 comes into contact with each respective lens contact pin 38 disposed on the lens mount 31 when the lens 30 has been properly attached to the camera body 10 so that the engaging blades 31c of the lens mount 31 have been inserted into the spaces between the engaging blades 11c, and closely rotated, behind the engaging blades 11c of the body mount 11 by a predetermined angle of rotation.

The camera body 10 is provided with a male coupler 19 which projects from the front face of the body mount 11 at a predetermined position thereon. The male coupler 19 is engaged with a corresponding female coupler (not shown) when the lens 30 has been properly attached to the camera body 10. The male coupler 19 is driven to rotate about the axis thereof by an AF motor (not shown) provided in the camera body 10 to drive the AF lens group provided in the lens 30 via the female coupler. The male coupler 19 and the female coupler together constitute a conventional AF coupler.

The camera body 10 is provided at the front thereof in the vicinity of the body mount 11 with a lens-lock-release button 20 which is manually depressed when the lens 30 is detached from the camera body 10.

The body mount 11 is provided in the vicinity of the lens-lock-release button 20 with a first through hole 11b. A lock pin (lock mechanism) 21 is fitted in the first through hole 11b from the rear side thereof (i.e., from within the camera body) to be movable forwardly and rearwardly. The lock pin 21 is interlocked with the lens-lock-release button 20 to move together with the lock release button 20 forwardly and rearwardly. In a free state, the tip of the lock pin 21 projects from the front face of the body mount 11 by a predetermined amount. In a state where the lens 30 is properly coupled to the camera body 10, the tip of the lock pin 21 is engaged with a lock hole 31a formed on the lens mount 31 at a corresponding position thereon. The rear end (inner end) of the lock pin 21 is fixed to one end of a lock-pin mount member 22 which moves together with the lens-lock-release button 20 in the direction of an optical axis O of the lens 30. Therefore, if the lens-lock-release button 20 is depressed, the lock pin 21 also moves rearwardly in the same direction to retreat in the camera body 10.

The lock-pin mount member 22, to which the lock pin 21 is fixed, is positioned in the camera body 10 and is guided in the direction of the optical axis O of the lens 30. A shaft 20a which extends in the direction of movement of the lens-lock-release button 20 (the right/left direction as viewed in FIG. 2) in the camera body 10 is formed integral with the lens-lock-release button 20. The tip of the shaft 20a normally comes into contact with an engaging portion 22a formed on the other end of the lock-pin mount member 22. If the lens-lock-release button 20 is depressed, the shaft 20a moves together with the lens-lock-release button 20 to move the engaging portion 22a in the same direction (to the left as viewed in FIG. 2). Namely, if the lens-lock-release button 20 is depressed, the shaft 20a pushes the engaging portion 22a to thereby make the lock pin 21 retreat into the camera body 10.

The lock-pin mount member 22 is provided with a shaft 26 which extends rearwardly from the engaging portion 22a in the direction of the optical axis O and coaxially to the shaft 20a of the lens-lock-release button 20. The shaft 26 penetrates a fixed guide frame 23, positioned in the camera body 10, through a guide hole 23a formed on the fixed guide frame 23 so that the shaft 26 is guided in the direction of the optical axis O.

Accordingly, if the lens-lock-release button 20 is depressed, the shaft 26 also moves rearwardly in the direction of the optical axis O. A coil spring 24 is fitted on the shaft 26 to be positioned between the guide frame 23 and the engaging portion 22a of the lock-pin mount member 22 with the coil spring 24 being compressed therebetween. Therefore, the lock-pin mount member 22 and the lens-lock-release button 20, which comes into contact with the lock-pin mount member 22, are always biased forwardly (to the right as viewed in FIG. 2) in the direction of the optical axis O by the spring force of the coil spring 24.

Figure 3:
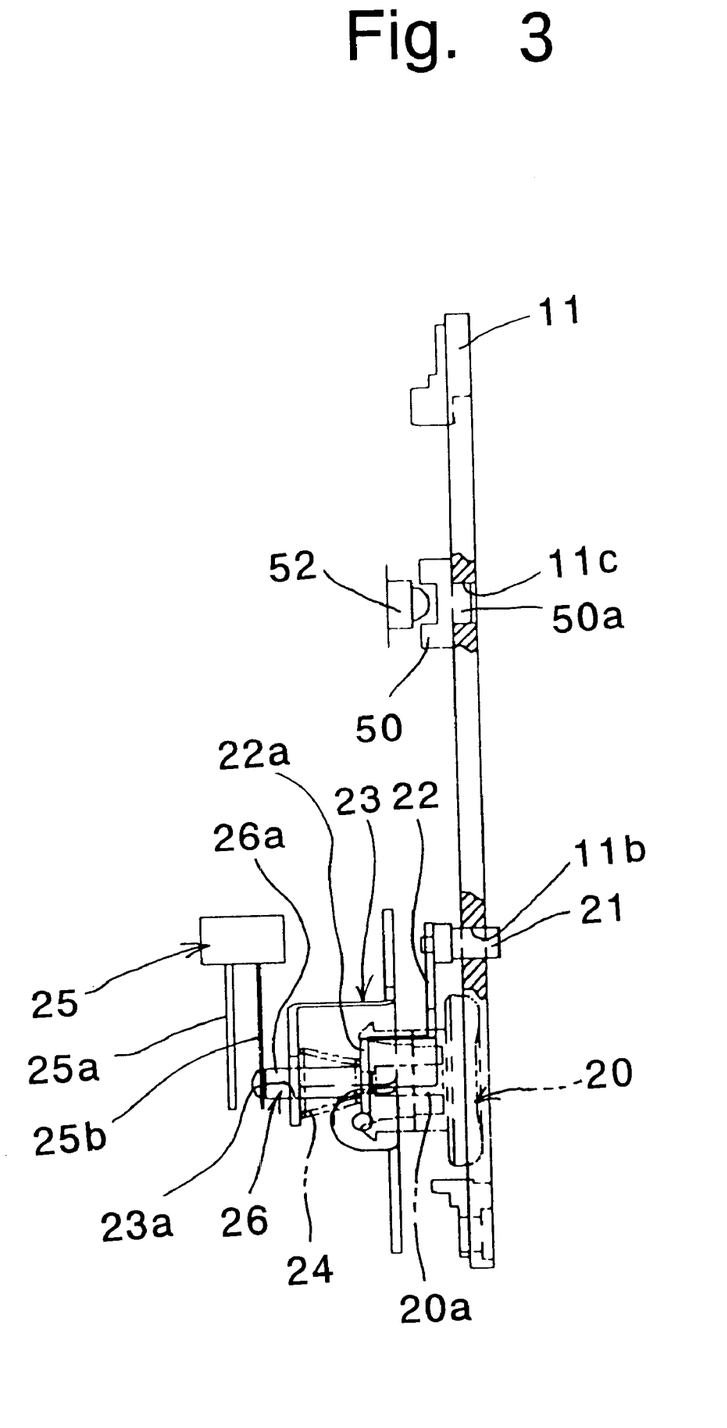
FIG. 3 is a side elevational view, partly in cross section, of the fundamental elements of the camera body shown in FIG. 2, showing a state before a lens-lock-release button of the camera body is depressed.
Figure 4:
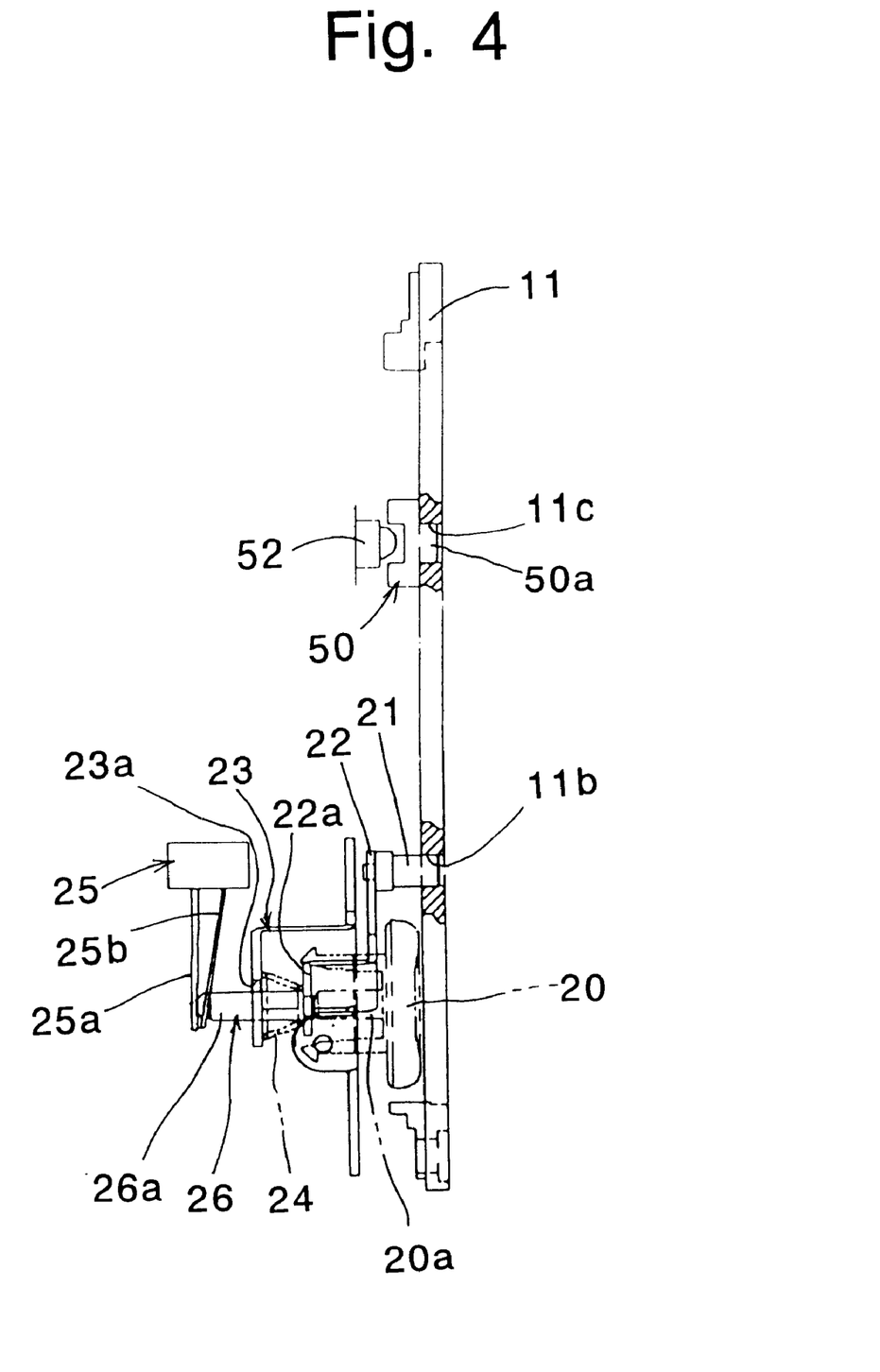
FIG. 4 is a side elevational view, partly in cross section, of the fundamental elements of the camera body shown in FIG. 2, showing a state where the lens-lock-release button of the camera body is depressed.

The camera body 10 is provided therein behind the guide frame 23 with a switch 25. The switch 25 is provided with two spring leaves 25a and 25b which are apart from each other by a predetermined gap (distance) in a free state, with the free end of the spring leaf 25b facing the tip 26a of the shaft 26. Each of the two spring leaves 25a and 25b is made of a resilient conductive material. The free end of the spring leaf 25b is pushed towards the spring leaf 25a to thereby come into contact with the spring leaf 25b if the lens-lock-release button 20 is depressed (see FIG. 4). Releasing the pushing force applied to the lens-lock-release button 20 causes the lens-lock-release button 20 to return to the initial position thereof by the spring force of the coil spring 24. This further causes the shaft 26 to return to the initial position thereof so that the spring leaf 25b springs apart from the spring leaf 25a (see FIG. 3).

The body mount 11 is provided with a second through hole 11c at a predetermined position at which a body index mark (transparent projection) 50a which is aligned with a lens index mark 31b (see FIG. 6) formed on the lens mount 31 of the lens 30 when the lens 30 is coupled to the camera body 10 is to be formed. A window member (transparent member) 50 is fixed to the rear face of the body mount 11 so as to close the rear end of the second through hole 11c. The window member 50 is formed integral with a transparent projection (body index mark) 50a which is snugly fitted into the second through hole 11c. The window member 50 is made of red transparent plastic, so that the transparent projection which is fitted in the second through hole 11c, functions as the body index mark 50a, which is aligned with the lens index mark 31b formed on the lens mount 31 of the lens 30 when the lens 30 is coupled to the camera body 10, since the red-colored transparent projection (body index mark) 50a can be seen as a red dot in the second through hole 11c from the outside the camera body 10. The body index mark 50a and the lens index mark 31b indicate a position of proper alignment of the lens mount 31 with respect to the body mount 11 when attaching the lens 30 to the camera body 10.

The camera body 10 is provided immediately behind the window member 50 with an LED (light source/illuminating device) 52 which is fixedly positioned in the camera body 10. If the LED 52 lights up, the window member 50 is illuminated from the rear side thereof (i.e., illuminated outwardly from inside of the camera body 10) by the LED 52 so that red light is projected outwardly through the red-colored transparent projection (body index mark) 50a. Accordingly, the LED 52 is provided as a light source for backlighting the transparent projection (body index mark) 50a from the inside of the camera body 10.

The camera body 10 is provided therein with a microcomputer (controller) 60 in charge of the overall control of the camera body 10 (see FIG. 5). The switch 25, the LED 52 and the set of body contact pins 18 are electrically connected to the microcomputer 60. The microcomputer 60 is provided therein with an internal timer 61 for measuring the time from the commencement of lighting of the LED 52.

The microcomputer 60 detects whether or not the lens 30 has been coupled to the camera body 10 in accordance with lens data sent from the lens 30 via the set of contacts 18. The microcomputer 60 and the set of contacts 18 are fundamental elements of a detector for detecting whether or not the lens 30 has been coupled to the camera body 10.

When the microcomputer 60 determines that the lens 30 has not been coupled to the camera body 10, if the lens-lock-release button 20 is depressed to close the switch 25, the microcomputer 60 starts supplying power to the LED 52 to turn the LED 52 on. Upon the commencement of power supply to the LED 52, the microcomputer 60 starts the internal timer 61 to start measuring the time of lighting of the LED 52 and subsequently stops supplying power to the LED 52 to turn it OFF after a predetermined period of time (e.g., five seconds) elapses.

The microcomputer 60 does not supply power to the LED 52 even if the lens-lock-release button 20 is depressed to close the switch 25 in the case when it is determined by the microcomputer 60 that the lens 30 has been coupled to the camera body 10.

The operation of the camera body 10 with respect to the attachment/detachment of the lens 30 will be hereinafter discussed. The operation of the camera body 10 when the lens 30 is attached to the camera body 10 will be discussed first. Firstly, the body index mark (transparent projection) 50a which is visible on the body mount 11 and the lens index mark 31b (see FIG. 6) on the lens mount 31 are aligned, and then the lens mount 31 is brought into contact with the body mount 11. Due to the alignment of the body index mark 50a and the lens index mark 31b, the engaging blades 31c of the lens mount 31 fit in between the engaging blades 11a of the body mount 11 so as not to collide with each other. Furthermore, when the lens mount 31 is brought into contact with the body mount 11, the engaging blades 31c of the lens mount 31 are positioned behind the engaging blades 11a of the body mount 11 with respect to the optical axis of the lens 30. Subsequently, the lens 30 is fully turned relative to the camera body 10 in a predetermined rotational direction (a direction that enables the coupling of the lens 30 to the camera body 10) by a predetermined angle of rotation. This causes each of the three engaging blades 11a of the body mount 11 to be engaged with the corresponding engaging blades 31c of the lens mount 31 wherein the engaging blades 31c are inserted behind the engaging blades 11c so that the lens mount 31 of the lens 30 can be supported by the body mount 11 of the camera body 10. At the same time, the tip of the lock pin 21 is engaged with the lock hole 31a with a click. This completes the operation of attachment of the lens 30 to the camera body 10.

As noted above, the body index mark (transparent projection) 50a on the body mount 11 is lit up to keep emitting red light for a predetermined period of time (e.g., five seconds) under the control of the microcomputer 60 if the lens-lock-release button 20 is depressed with no lens being mounted on the camera body 10. Therefore, the index marks of the body mount 11 and the lens mount 31 can be easily aligned even in dim light or in the dark because the body index mark (red-colored transparent projection) 50a on the body mount 11 emits red light by simply depressing the lens-lock-release button 20. Consequently, the lens 30 can be easily attached to the camera body 10 even in dim light or in the dark.

The operation of the camera body 10 when the lens 30 is detached from the camera body 10 will be hereafter discussed. Firstly the lens-lock-release button 20 is depressed to retreat the lock pin 21 from the lock hole 31a, and then the lens 30 is turned relative to the camera body 10 in the reverse rotational direction (a direction of disconnecting the lens 30 from the camera body 10) opposite to the aforementioned predetermined rotational direction by a predetermined angle of rotation. This causes each of the three engaging blades 11a of the body mount 11 to be disengaged from the corresponding engaging blades of the lens mount 31. This completes the operation of disconnection of the lens 30 from the camera body 10.

When the lens 30 is disengaged (and subsequently removed) from the camera body 10, the body index mark (transparent projection) 50*a* on the body mount 11 is not lit up via control of the microcomputer 60 even if the lens-lock-release button 20 is depressed. According to such control of the microcomputer 60, the power consumption of the battery (not shown) accommodated in the camera body 10 as a power source thereof is reduced because the body index mark (transparent projection) 50*a* is not lit up when the lens 30 is disengaged from the camera body 10.

As can be understood from the foregoing, according to the illustrated embodiment of the camera body 10 to which the present invention is applied, the lens 30 can be easily coupled to the camera body 10 even in dim light or in the dark.

In the illustrated embodiment, although the body index mark (transparent projection) 50*a* on the body mount 11 is backlit by the LED 52 from the inside of the camera body 10, the present invention is not limited solely to this particular embodiment. For instance, the body index mark can be a conventional type of index mark formed on the body mount as a simple printed or engraved index mark. In this case, a light source such as an LED can be fixed to the camera body in the vicinity of the body index mark to illuminate the same. Alternatively, the light source (e.g., an LED) can be provided so as to illuminate the entire body mount 11 or a substantial portion thereof. This LED can be turned ON and OFF by control of the microcomputer 60.

In the illustrated embodiment, although the LED 52 is turned OFF after a predetermined period of time (e.g., five seconds) elapses, from when the LED 52 is turned ON, the predetermined period of time may be set at less or more than five seconds. Furthermore, the LED 52 may be turned ON only during the time the lens-lock-release button 20 is held depressed (i.e., during the time the switch 25 is held closed).

In the illustrated embodiment, although the window member 50 provided with the transparent projection 50*a* which functions as a body index mark is made of a red transparent plastic, the window member 50 may be made of a transparent material of any other color. Alternatively, the window member 50 can be made of a translucent plastic, as long as it allows light to pass therethrough.

In the illustrated embodiment, although the body mount 11 is a bayonet mount type, the body mount 11 may be any other type, for example, a screw-type mount.

As can be understood from the foregoing, according to the camera body to which the present invention is applied, since the camera body is provided with a body mount to which the lens mount of an interchangeable lens is detachably attached, a body index mark which indicates the position of proper alignment of the body mount with respect to the lens mount of the interchangeable lens when the interchangeable lens is attached to the camera body, and a light source for lighting the body index mark; it is easy to attach the lens to the camera body even in dim light or in the dark.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A camera body, comprising:
   a body mount adapted to detachably attach an interchangeable lens thereto;
   a body index mark which indicates a position of proper alignment of the interchangeable lens with respect to said body mount in order to attach the interchangeable lens to said camera body; and
   an illuminating device which illuminates said body index mark.

2. The camera body according to claim 1, wherein said body index mark is brought into alignment with a lens index mark of said interchangeable lens when said interchangeable lens is attached to said camera body.

3. The camera body according to claim 1, wherein said body index mark comprises a transparent member having a transparent projection fitted into a through hole formed on said body mount; and
   wherein said illuminating device comprises a light source for lighting said transparent member from the inside of said camera body.

4. The camera body according to claim 3, wherein said transparent member is colored.

5. The camera body according to claim 3, wherein said light source comprises an LED positioned immediately behind said transparent member.

6. The camera body according to claim 1, further comprising:
   a lock mechanism for locking said interchangeable lens on the body mount after said interchangeable lens is properly coupled to said camera body;
   a lens-lock-release button which unlocks said lock mechanism when depressed;
   a switch which is open or closed in accordance with the operation of said lens-lock-release button; and
   a controller which turns said illuminating device ON or OFF in accordance with a change in an open/closed state of said switch.

7. The camera body according to claim 6, wherein said controller turns said illuminating device ON at the time said open/closed state of said switch changes in accordance with a depression of said lens-lock-release button.

8. The camera body according to claim 7, wherein said controller subsequently turns said illuminating device OFF after a predetermined period of time elapses.

9. The camera body according to claim 6, further comprising a detector for detecting whether or not said interchangeable lens is attached to said body mount;
   wherein said controller controls said illuminating device such that said illuminating device remains OFF in the case where said detector detects that said lens mount is attached to said body mount even if said lens-lock-release button is depressed.

10. The camera body according to claim 1, further comprising a switch which can be manually turned ON and OFF;
    wherein said illuminating device comprises a light source which is turned ON and OFF when said switch is turned ON and OFF, respectively.

11. The camera body according to claim 1, wherein said body mount comprises a bayonet type mount.

12. A camera body, comprising:
    a body mount adapted to detachably attach an interchangeable lens thereto;
    a body index mark which indicates a position of proper alignment of said body mount with respect to a lens mount of the interchangeable lens when the interchangeable lens is attached to said camera body;

an illuminating device which illuminates said body index mark;

a detector that detects whether the interchangeable lens is attached to said body mount; and a controller which prevents said illuminating device from turning ON when said detector detects that the lens mount is attached to said body mount.

13. A camera body, comprising:

a body mount adapted to detachably attach an interchangeable lens thereto;

a lens-lock-release button which is manually depressed when the interchangeable lens is attached to said body mount; and a light source which is turned ON when said lens-lock-release button is depressed to attach the interchangeable lens to said body mount, wherein said light source illuminates said body mount.

14. The camera body according to claim 13, further comprising a body index mark which is brought into alignment with a lens index mark of said interchangeable lens when said interchangeable lens is attached to said camera body;

wherein said light source is turned ON to emit light towards said body index mark when said lens-lock-release button is depressed.

15. The camera body according to claim 14, wherein said body index mark is made of a material which allows light to pass therethrough, said light source emitting light outwardly from inside said camera body via said body index mark.

* * * * *